Sept. 19, 1967   J. PAVELKA, JR., ET AL   3,342,121
ELECTRIC TOASTER
Original Filed Jan. 28, 1963   2 Sheets-Sheet 1

Inventors
Frank Stanek
Joseph Pavelka, Jr.
By Bedell & Burgess
Attys

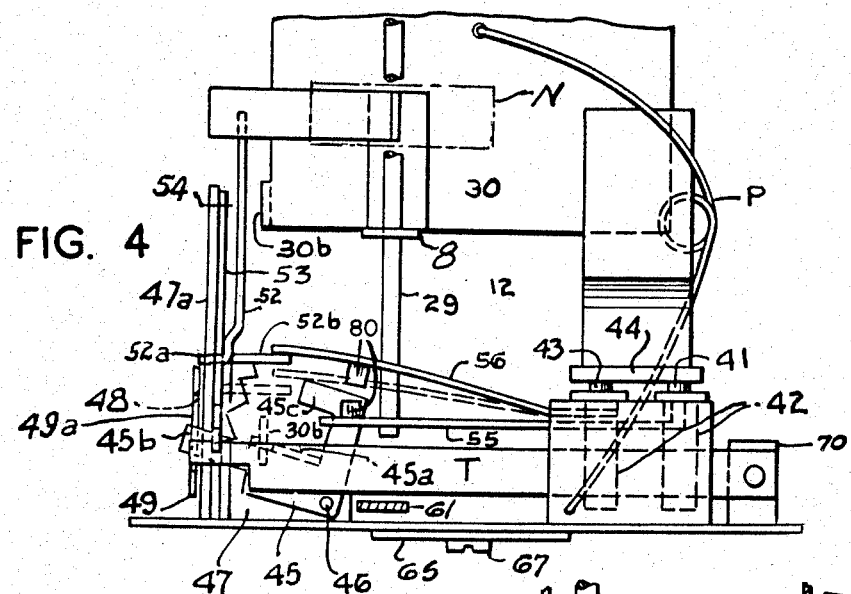
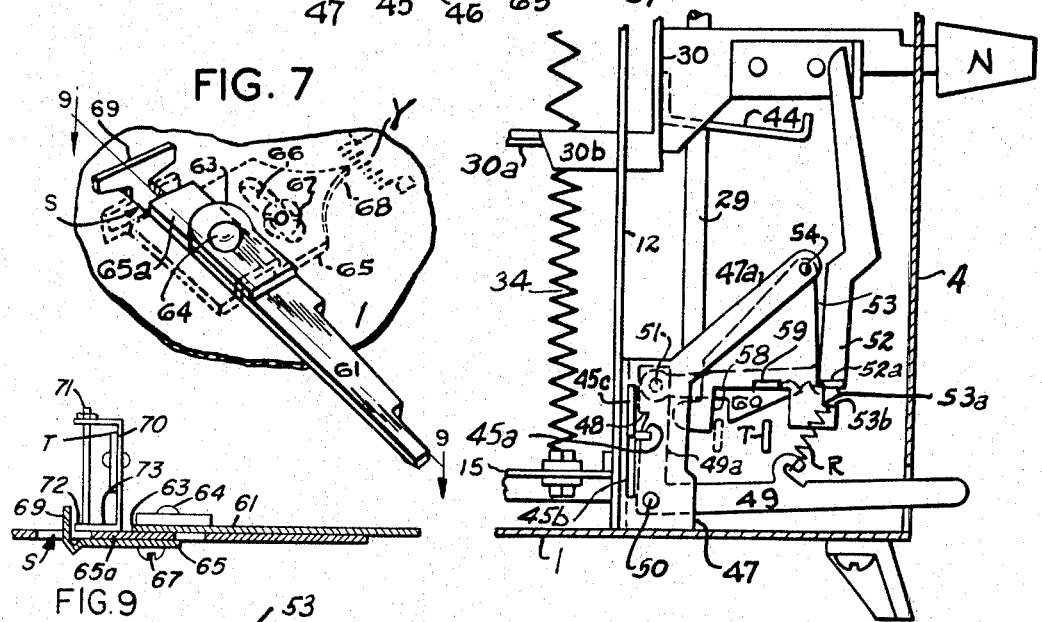
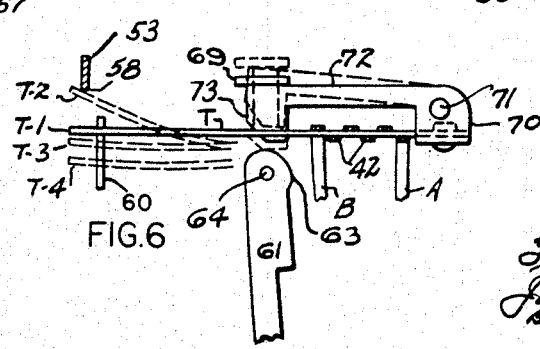

', 'United States Patent Office 3,342,121
Patented Sept. 19, 1967

3,342,121
ELECTRIC TOASTER
Joseph Pavelka, Jr., St. Louis, and Frank Stanek, St. Louis County, Mo., assignors to The Toastswell Company, St. Louis, Mo., a corporation of Missouri
Original application Jan. 28, 1963, Ser. No. 254,317. Divided and this application Jan. 13, 1966, Ser. No. 520,385
2 Claims. (Cl. 99—329)

This application is a division of an application filed Jan. 28, 1963, Serial No. 254,317 (now abandoned).

The invention relates to electric bread toasters and more particularly to the control of the energizing circuit therefor. Among the objects of the invention are to provide for the user readily selecting different extremes for the color resulting from the toasting cycle without affecting the normal manual adjustment of the toaster control thermostat for successive operations within the selected range of color.

This and other detail objects are attained by the structure illustrated in the accompanying drawings in which:

FIG. 1 is a perspective of a two-slice domestic toaster of the type as referred to.

FIG. 4 is a detail end view of the switch and latch structure looking in the direction of arrow 4 (FIG. 2) and is drawn to a larger scale.

FIG. 5 is a detail side view of the latch and release structure controlled by the thermostat, adjacent portions of the toaster housing being sectioned.

FIG. 6 is a detail top view of the thermostat bimetal and its mounting in successive normal, heating and cooling positions.

FIG. 7 is a detail perspective of the device for adjusting the thermostat cam to select a different extreme color range, the device being below the housing base and shown in broken lines.

FIG. 9 is a vertical section approximately on line 9—9 of FIG. 7.

Figure 2:
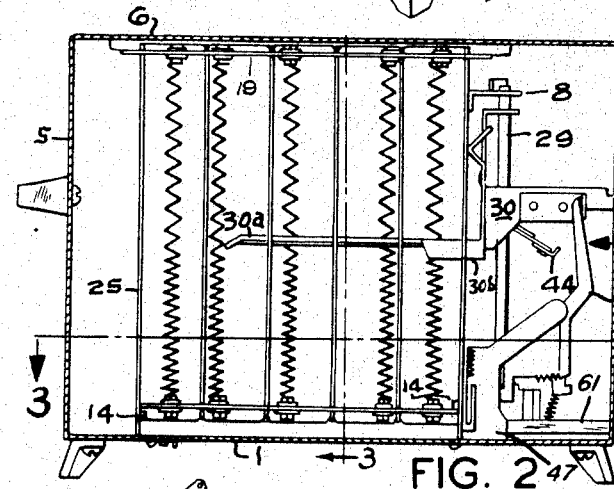
FIG. 2 is a longitudinal vertical section approximately on line 2—2 of FIG. 1.

The toaster body includes a base 1 and a housing with side walls 2, 3, end walls 4, 5 and a top wall 6 apertured at 7 to receive bread slices. Upright end plates 12, 13 are mounted on base plate 1. Lower longitudinal bars 15, 16, 17 are spaced apart and extend between end plates 12, 13. Corresponding upper longitudinal bars 19 (FIG. 2) also extend between plates 12, 13.

Figure 3:
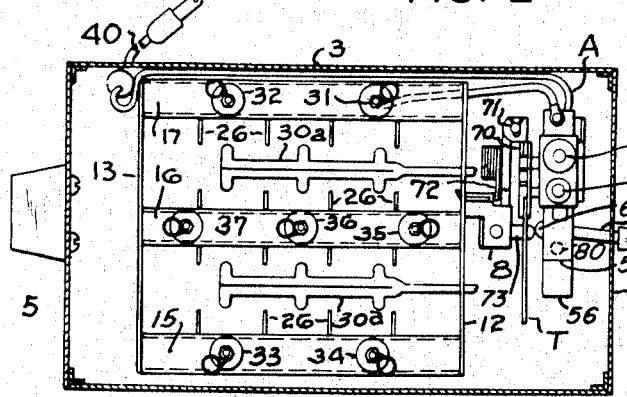
FIG. 3 is a horizontal section approximately on line 3—3 of FIG. 2 with some parts eliminated. The figure mainly shows the relative positions of the slice carrying parts and heating elements and the switch and latch structure detailed in FIGS. 4–7.
Figures 10, 11, 12:
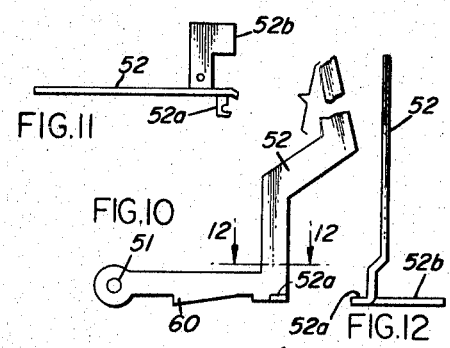
FIG. 10 is a detail elevation of a lever shown in the assembly of FIGS. 2, 5.
FIG. 11 is a top view of the same.
FIG. 12 is a right hand end view of the same.

A plurality of upright slice-positioning wires 25 are disposed at intervals within the housing and their horizontal terminals 26, at least, are of yielding material and are hooked into downwardly and upwardly open notches in the lower and upper bars respectively. An upright rod 29 is secured to clips 8 on end plate 12 (FIGS. 2, 3, 4) and slidably mounts a carrier 30 including two slice support arms 30a extending inwardly through vertically elongated slots in plate 12. The carrier has an outwardly projecting handle N by which the carrier may be lowered manually. Normally the carrier is held elevated by a torsion spring P (FIG. 4).

A plurality of upright, narrow diameter, electric resistance helical coils 31, 32, 33, 34, 35, 36, 37 behind slice positioning wires 25 are secured at their opposite ends to the lower and upper bars 15, 16, 17 and corresponding upper bars one of which is shown at 19.

Figure 8:
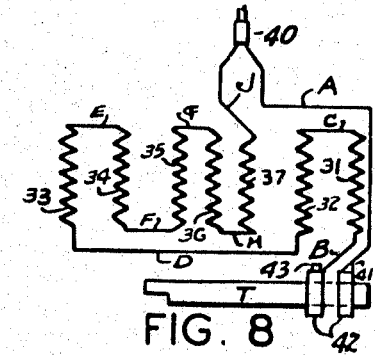
FIG. 8 is a wiring diagram including resistance heating coils and a bimetal thermostat blade.

An electric circuit for energizing the toaster coils runs from a connector plug 40 (FIGS. 3, 8) along wire A to a switch terminal 41, through a heating ribbon 42, surrounding a thermostat bimetal T, to a switch terminal 43. A spring bar connector 44 on carrier 30 (FIGS. 4, 5) contacts terminals 41, 43 when the carrier is lowered and the current passes through ribbon 42 and wire B to the lower end of side coil 31 near the side wall 3, to a jumper C at the upper end of that coil to the upper end of the adjacent side coil 32, to an offset jumper D at the lower end of that coil to the lower end of a side coil 33 near the opposite side wall 2, to a jumper E at the upper end of the latter coil to the adjacent side coil 34, to a jumper F at the lower end of the latter-mentioned coil to the lower end of one of the central coils 35, to a jumper G from the upper end of the latter-mentioned coil to the upper end of the middle coil 36, to a jumper H at the lower end of the latter-mentioned coil to the lower end of the remaining central coil 37, and through wire J back to connector 40. Supplemental spring switch blades 55, 56 (FIG. 4) extend from terminals 41, 43 respectively and carry contacts 80.

Figure 15:
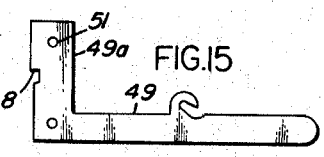
FIG. 15 is a detail elevation of a manual release lever shown in the assembly of FIG. 5.
Figure 16:
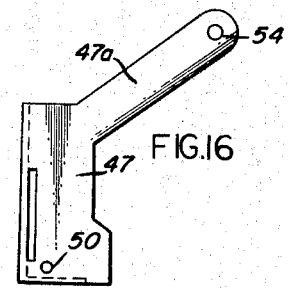
FIG. 16 is a detail elevation of a mounting bracket shown in the assembly of FIG. 5.

When carrier 30 is lowered manually, against the thrust of spring P, its downwardly projecting finger 30b (FIG. 2) strikes a ledge 45a (FIG. 4) on the lower leg 45b of a latch 45 and rotates the latch counterclockwise on its pivot 46 on an angular bracket 47 (FIG. 5), mounted on base 1, until the latch lower leg 45b is engaged by a downwardly facing catch 48 (FIGS. 5, 15) on the upstanding arm 49a of an L-shaped manual release lever having an offset horizontal arm 49 pivoted at 50 on bracket 47 and urged counterclockwise by a spring R connected to the lower end of an L-shaped lever 52 (FIGS. 2, 5, 10–12), pivoted at 51 to the upright arm 49a of the first mentioned lever. The anticlockwise rotation of latch 45 (FIG. 4), swings its upper leg 45c over lower carrier finger 30b to hold the carrier down until catch 48 is released.

Catch 48 and the slice carrier may be released manually at any time by depressing lever arm 49, whereupon spring P raises the carrier and opens main switch 44 and terminates the toaster operation. Catch 48 and the carrier may be released automatically by the action of bimetal T which, when cool, parallels the elongated leg 72 of a bracket (FIGS. 6, 9) the right hand end 70 of which is freely pivoted on an upstanding pin 71 on base 1. The other end of leg 72 terminates in a foot 73 which extends transversely of the leg and the bimetal.

Figures 13, 14:
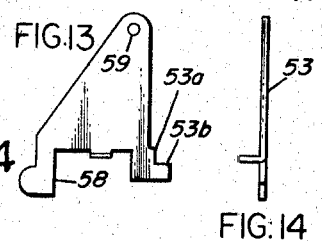
FIG. 13 is a similar detail elevation of a release member shown in the assembly of FIG. 5.
FIG. 14 is a right hand end view of the same.

A plate 65 beneath body base 1 (FIGS. 7, 9) has a boss 65a and an upstanding shoulder 69 received in a slot S in the base elongated transversely of leg 72 and bimetal T. A screw 67 is threaded into base 1 and passes through a slot 66 in plate 65. The screw head clamps the plate to the base. A selector arm 61 is pivoted at one end to boss 65a and projects outwardly of the housing. The pivoted end of the arm forms a cam 63. Bracket foot 73 lies between opposing faces of cam 63 and shoulder 69. When the bimetal is heated and bends, it rotates the bracket in an anticlockwise direction about pin 71 until foot 73 engages cam 63 as a stop. Continued heating and distortion of the bimetal causes it to engage the upright edge 58 of release member 53 (FIGS. 5, 6, 13) and rotate the latter about its pivot 54 on bracket arm 47a to shift an upwardly facing shoulder 53a inwardly and unseat a lug 52a on lever 52 (FIGS. 5, 10, 12) whereupon spring R pulls lever 52 down to seat lug 52a on a lower shoulder 53b. Such movement lowers a horizontal lip 52b on lever 52 (FIGS. 4, 12), which normally supports a switch blade 56 as shown in FIG. 4, so that contacts 80 engage. This direct connection 41, 55, 80, 56, 43 shunts out the circuit through resistance heater 42 and bimetal T begins to cool and moves outwardly (FIGS. 3, 5, 6) until it engages depending tooth 60 on lever 52 and pushes the lower arm of lever 52 to the right, thus pulling pin 51 and upstanding lever arm 49a to release latch leg 45b from catch 48, the same as manual depression of lever arm 49, whereupon carrier spring P raises carrier 30 to its original position and the heating coil circuit is opened and the toasting operation completed.

Figure 1:
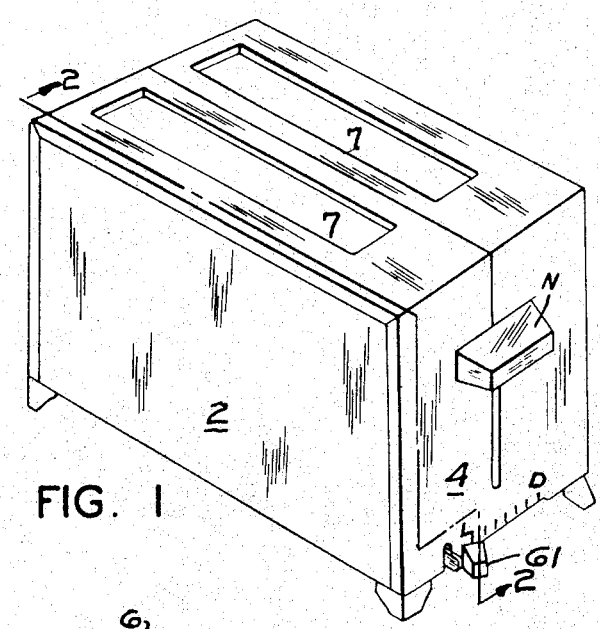

As is common practice, the user of the toaster may determine whether a toast slice is to be relatively light or dark in a given range of browning by manual shifting of the outer end of arm 61 toward the L or D marking on casing end wall 4 (FIG. 1). If selector arm 61 is moved toward the left, i.e., toward the L position (FIG. 1), the surface of cam 63 moves closer to, but does not affect the initial cold position of bimetal T or of bracket leg 72, and since the point of engagement of foot 73 with cam 63 is relatively close to edge 58 of lever control member 53, when the bimetal is in position T-3, it accordingly takes a relatively short time for the end of the bimetal to move to position T-2 into engagement with edge 58 whereby bimetal heater 42 is shunted out as described above. Accordingly bimetal T cools promptly, and in its return movement engages the left hand edge of tooth 60 and opens the shunt circuit switch and the toasting operation is terminated in correspondingly short time, with resultant lighter toast. On the other hand, if toast selector arm 61 is moved to the right, the distance between cam 63 and foot 73 of leg 72 increases, and, when the bimetal begins to heat, it must bend a greater degree before it causes foot 73 to move a substantial distance counterclockwise into engagement with cam 63, so that the left end of the bimetal is in the position T-4, substantially farther from position T-2 than position T-3, and it will accordingly take it a longer time to move the greater distance from T-4 to T-2, where it actuates the shunt circuit switch only after a corresponding increase in the length of the toasting operation.

The above described bimetal action, as controlled by the shifting of arm 61, is not new and does not in itself constitute the present invention but further variation of the timing effected by bimetal T is readily obtained by the user inverting the toaster, loosening screw 67 and shifting plate 65 along a scale Y on the lower face of the base and tightening the screw. These settings of plate 65 and the resultant range of dark to light toast can be varied as desired but usually will not be made frequently. Thereafter individual variation for relatively light and dark toast in the selected range is effected by shifting arm 61 on its pivot as described above. The described adjustment of plate 65 may be made at the factory, arbitrarily, or by the retailer selling the toaster in compliance with the customer's preference, or readily by the customer himself. Hitherto such primary adjustment has been attained mainly only in an electric appliance servicing shop where a special skill and tool were available.

The construction and arrangement of parts as described above attains the general objective of the invention as set forth at the beginning of this specification. The parts may be varied without departing from the spirit of the invention and the exclusive use of modifications coming within the scope of the claims is contemplated.

What is claimed is:

1. In combination in a bread slice toaster including a housing having a base and electric resistance heating elements, operating mechanism therefor including an energizing electrical circuit for said heating elements, a switch controlling said circuit, a vertically movable slice carrier adjacent to said heating elements and movable to a lowered position to close said switch and to a raised position to open said switch, spring means normally supporting the carrier in the raised position, a latch engaging the carrier when lowered to hold the carrier against the thrust of said spring means, an upstanding pin on said base, a bracket swingably mounted on said pin, a bimetal elongated timer member fastened to one end of said bracket, said bracket having an elongated flat radial leg which normally extends parallel to said timer member and which has a free end which is adapted to slide along the upper surface of said base, said timer member functioning to release said latch when the timer member heats up, warps, and moves relative to said flat radial leg free end, a cam lever slidably mounted on the upper surface of said base adjacent said leg free end, and a manually operable device for readily adjusting the timing period of said timer member within a given range of temperatures, said device including a flat member slidably mounted on the bottom surface of said base and having an upstanding member which extends through an elongated opening in said base to a position above said upper surface and being located on the opposite side of said leg free end from said cam lever, said device being adapted to be adjustably positioned along said opening, said cam lever being pivotally mounted on said flat member.

2. A bread slice toaster combination according to claim 1 in which the bottom surface of said base has a scale thereon not visible when the housing is in normal operating position, and said flat member has an indicator movable along said scale.

References Cited

UNITED STATES PATENTS

| | | | |
|---|---|---|---|
| 2,585,465 | 2/1952 | Humphrey | 99—329 |
| 2,605,696 | 8/1952 | Gerber | 99—329 |
| 2,609,473 | 9/1952 | Olson et al. | 99—329 X |
| 2,692,549 | 10/1954 | Olson et al. | 99—329 |
| 2,906,194 | 9/1959 | Schwaneke | 99—329 |
| 3,032,424 | 5/1962 | Visos | 99—329 |
| 3,145,645 | 8/1964 | Jepson et al. | 99—329 |

BILLY J. WILHITE, *Primary Examiner.*